April 30, 1957   J. B. McCLARY   2,790,868
FLOW-RESPONSIVE CONTROL DEVICE
Filed Nov. 8, 1954
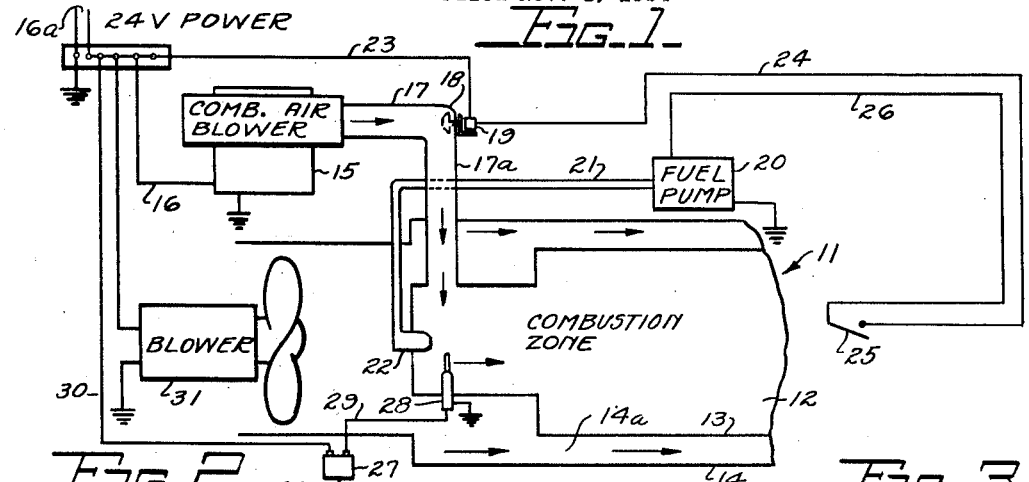
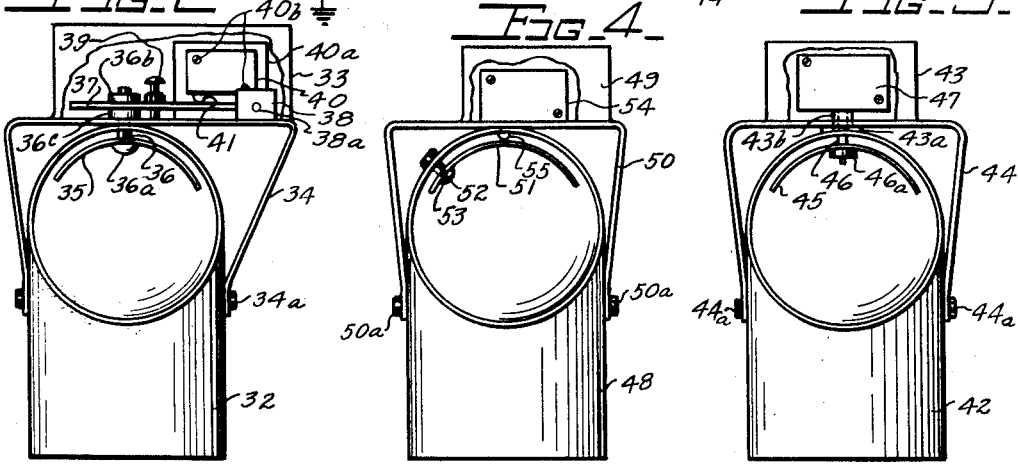
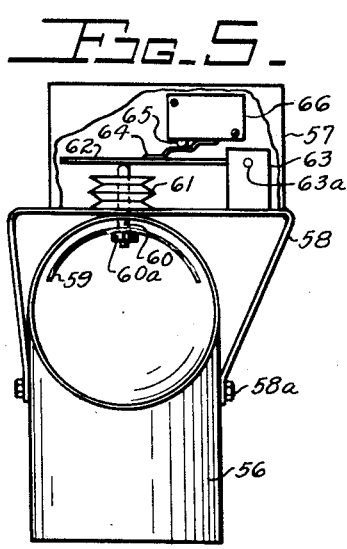
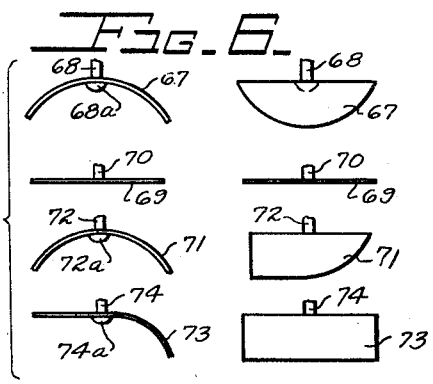
INVENTOR.
JACK B. McCLARY
BY Lloyd B. Stevens, Jr.
Wade Koonty AND
ATTORNEYS

United States Patent Office 2,790,868
Patented Apr. 30, 1957

2,790,868

FLOW-RESPONSIVE CONTROL DEVICE

Jack B. McClary, Dayton, Ohio, assignor to the United States of America as represented by the Secretary of the Air Force Application November 8, 1954, Serial No. 467,664

6 Claims. (Cl. 200—81.9)

(Granted under Title 35, U. S. Code (1952), sec. 266)

The invention described herein may be manufactured and used by or for the United States Government for governmental purposes without payment to me of any royalty thereon.

Flow indicators somewhat similar to my device are known, e. g., a flow indicator such as is described in U. S. 2,347,830. This flow indicator includes a curved plate transversely in a pipe so the flow of a fluid in the pipe will move the plate to operate a switch. This device is particularly designed for use in fire extinguisher system wherein there is normally no flow in the pipe in which the flow indicator is located. In case of fire or in any case where there is a leak from the system and flow in pipe occurs this flow indicator is actuated by the fluid flowing in the pipe. The curved plate of this patent being located as it is transverse to the flow of fluid in the pipe, causes a substantial pressure drop in the pipe when fluid is flowing therein, since most of the cross sectional area of the pipe is occupied by the plate and only the area between the outer periphery of the plate and the inner periphery of the pipe is available for fluid flow. Also the turbulence introduced in the flowing fluid by such an insallaion causes an appreciable pressure drop. In a fire extinguishing system or other system where there is normally no flow in the pipe having the patented device installed therein, the patented device is not nearly so objectionable as in a system where there is normally flow in the pipe such as the system in which my device is particularly designed to operate. Although, even in a fire extingushing system it would appear that a substantial amount of pressure would be lost which could more suitably be used to spray the water from the sprinkler or other fire extinguishing system. The flow indicator of this patent would not be suitable for use in a pipe where fluids were normally flowing and where it was desired that no substantial pressure drop be caused in the system by the flow indicating device.

An object of my invention is to provide a flow-responsive device which may be used as a switch to actuate any type of mechanism.

Another object of my invention is to provide a flow-responsive device which may be actuated by any type of flowing fluid including liquids, gases, fluidized solids, etc.

Still another object of my invention is to provide an inexpensive device of simple construction which is responsive to fluid flow, is suitable for installation in pipe elbows, and which may be used to actuate and control associated electrical systems.

A further object of my invention is to provide a flow-responsive device suitable for installation in pipe elbows which device will introduce no significant pressure drop in the system or turbulence to the fluid flowing in the system.

A still further object of my invention is to provide a flow-responsive device which will consistently and dependably operate at any temperature from temperatures as low as −65° F. or lower to as high as 100° F. or higher.

An additional object of my invention is to provide a flow-responsive device usable in pipe elbows to indicate the absence or pressure flow in the pipe wherein the elbow is located.

A particular object of my invention is to provide a flow-responsive device suitable for installation in an elbow in the combustion air supply line of a heating system which device will cut off the supply of fuel to the system in case the supply of combustion air fails, and thereby explosions in the system are avoided.

These objects, as well as other objects, which will be obvious from the following detailed description of my invention are accomplished by my invention which comprises a movable plate located in an elbow and so positioned that the incoming fluid to the elbow strikes the plate substantially perpendicularly or at least so there is a substantially perpendicular component of force acting on the plate. This plate may be used without intermediate connections to operate a switch. The switch may be located within the pipe elbow but more suitably is located outside the elbow with suitable connections being made through an opening in the elbow to operate the switch. To obtain a better mechanical advantage the plate may be used to operate a lever which operates the switch. Alternately the plate may be rigidly attached to the operating button of the switch. The switch if located outside the elbow may be enclosed in a pressure-tight case so no fluid may escape from the system, or a bellows may be used to enclose the opening in the elbow preventing fluid from escaping therefrom.

This device is usable in 90 degree elbows, 45 degree elbows, elbows providing abrupt or gradual changes in direction, elbows of any substantial degree change in direction, tube turns, etc., and, throughout this entire specification including the claims, elbows wherever used without qualification are defined to include all these angular sections of pipe. It is only necessary that the plate be located in the elbow so it is acted upon by a substantial component of fluid force acting perpendicular to the plate.

In case there is a liquid flowing in the elbow a bellows is preferred for preventing the fluid from leaking from the elbow. If the fluid were a gas which would not in any way damage the switch a pressure-tight housing covering the switch and elbow opening is preferred. In the system for which my device was primarily designed it is not necessary to prevent leakage of the fluid from the elbow since this fluid is air and a minor amount of leakage will do no substantial damage to the operation of the system.

My device may be located in elbows which are arranged vertically, horizontally or slanting. Normally it is preferred that the inlet portion of the elbow wherein my device is located be substantially vertical and the fluid flow therein in an upward direction. However, the elbow may be slanted from the vertical appreciably and the device will work almost as well. However, the device will work when the elbow is horizontal or when the fluid is flowing downward in the inlet portion of the elbow, or in fact with the elbow positioned in any manner, but these arrangements are not the preferred type of installation. It is only necessary to adjust the spring of the switch operating button or the lever associated with the switch depending upon the particular installation of my device.

Plates suitable for my invention have various shapes. Normally it is preferred to use a plate which tends to conform to the inner surface in the vicinity of plate location of the elbow in which it is located and to locate the plate as close as is conveniently possible to the inner surface of the elbow to avoid introducing a substantial pressure drop in the system and turbulence in the flowing fluid. However, the plate may be a flat plate or a plate of most any shape and it may be located most anywhere within the elbow, provided a substantial component of force of the incoming fluid to the elbow will act perpendicular to the plate.

Some suitable switches for use in my device are "Micro" switches AN3432–1, V3–1, GR–L, and YZ–RL8–A2 made by the Micro Switch Corporation of Freeport, Illinois; "Acro" switch RD–10 made by the Acro Switch Division, Acro Manufacturing Company, Columbus, Ohio; and "Unimax" switch 10SMX–1–Z74 made by the Unimax Precision Switch Company of New York City, New York. These specific switches are named only as illustrative of satisfactory switches for use in my invention and are not meant to be and are not an exhaustive list of all the types of switches usable in my invention.

The invention will be more clearly understood from the following detailed descriptions of specific embodiments thereof read in conjunction with the accompanying drawings wherein:

Fig. 1 is a schematic view showing my device incorporated in a heating system to stop a fuel pump in case of failure of the combustion air supply;

Fig. 2 is an elevational view wherein a portion of the case of my device is broken-away to more clearly show the elements and arrangement therein;

Fig. 3 is an elevational view similar to Fig. 2 of another embodiment of my device;

Fig. 4 is a view similar to Fig. 2 of a third embodiment of my device;

Fig. 5 is a view similar to Fig. 2 of a fourth embodiment of my device;

Fig. 6 shows side and front elevational views of a number of different plates suitable for use in my device.

Referring to Fig. 1, an air heating system is shown for indirectly heating air. The fuel used for heating the air in this system is gasoline. Heat exchanger 11 of this system is composed of a combustion zone 12 enclosed by an inner shell 13. Surrounding this inner shell is an outer shell 14 providing an air space 14a between the inner and outer shells. Combustion air blower 15 takes air from the surroundings, feeds it through pipe 17, elbow 18 and pipe 17a to combustion zone 12. Power is provided to run blower 15 by 24 volt D. C. power source 16a via line 16 and ground. In elbow 18 is located my flow-responsive device 19. A fuel pump 20 pumps gasoline from a source (not shown) through pipe 21 to nozzle 22 which is connected to combustion zone 12. Power to run fuel pump 20, which is an electrical motor operated fuel pump, is provided by power source 16a. This power is carried by line 23 through device 19, line 24, thermostatic switch 25 and line 26 to the fuel pump and ground. The gasoline is ignited in the combustion zone by spark igniter 27 which operates continuously and feeds spark plug 28 by line 29 and ground. Power to spark igniter 27 is provided by line 30 and ground from power source 16a. Blower 31 circulates air through air space 14a around the combustion zone so the air is heated to the desired temperature. The temperature to which the air is heated is regulated by thermostatic switch 25 to about ±5° F., in a range of temperatures from 150° F. to 280° F. If the combustion air supply as provided by combustion air blower 15 fails, device 19 opens the circuit between lines 23 and 24 to cause fuel pump 20 to stop for lack of power. As soon as the combustion air blower is put into operation again device 19 completes the circuit between lines 23 and 24 and power is again available to operate the fuel pump 20. Thereby, the fuel pump is prevented from feeding an excess of fuel to the combustion zone when there is an inadequate supply of air for good combustion of the gasoline. Serious explosions have resulted when the mixture of gasoline vapors with air has been allowed to become too rich in the combustion zone since spark igniter 27 is continually operating spark plug 28 in the combustion zone. My device will prevent such a situation from occurring.

Fig. 2 shows a detailed view of one embodiment of my pressure-responsive device. Pin 36 extends through an opening in the middle of plate 35 and is rigidly attached thereto by weld 36a, and pin 36 extends up through openings in elbow 32 and bracket 34. The upper portion of pin 36 is threaded and it extends through an opening in lever 37 and is rigidly attached thereto by nuts 36b and 36c. Frames 38 and 40a are rigidly attached by welding or other suitable means to bracket 34 which is attached to elbow 32 by bolts 34a or other suitable means. Alternatively frames 38 and 40a may be formed as integral parts of bracket 34. Lever 37 is attached in hinged fashion to frames 38 and 40a by pin 38a. Switch 40, which may suitably be "Micro-Switch" AN3234–1 is mounted on a frame 40a by bolts 40b or other suitable means. Switch 40 is shown with its operating button 41 associated with lever 37 such that the movement of lever 37 will operate the switch. Lever 37 has an adjustable screw means 39 attached to it for limiting the direction of travel of the lever in a direction toward elbow 32. Switch 40 and lever 37 with associated components are shown enclosed within case 33, which is supported by bracket 34. This case may be a pressure-tight case which fits closely around the opening in the elbow and the pin extending therethrough to form a seal and prevent fluid from leaking from the elbow and case, and it is preferred that this case be removable for replacement of the switch and other parts.

In a system like Fig. 1 and a device like Fig. 2 except that the switch was similar to the one used in Fig. 5 some tests were made. It was found that the plate caused a pressure drop of only about 0.1" of $H_2O$ static pressure drop in the system operating at a total static pressure of about 8" of $H_2O$ in the elbow. It was further found that changing the position of the switch to give shorter and longer lever arms operating on the switch allowed the sensitivity of the device to be varied widely from operation of the switch at 2" $H_2O$ to 6" $H_2O$ static pressure in the elbow representing the driving force causing air flow in the elbow. Sensitivity can also be varied by varying the spring tension in the switch on its operating button and in the case of a switch such as that shown in Fig. 5 also by varying the tension on the spring lever of the switch.

Fig. 3 illustrates another embodiment of my flow-responsive device. In this embodiment pin 46 is the operating button of switch 47 and the pin is reduced in diameter and threaded on a short portion of its free-end. Pin 46 extends down through openings in bracket 44 and elbow 42, and plate 45 having an opening in the center thereof is rigidly positioned on the pin by nut 46a. Bracket 44 is attached by bolts 44a to elbow 42, and sleeve 43a is attached around the openings in the bracket and the elbow by welding or other suitable means to form a leakproof conduit communicating the openings. Sleeve 43b is sealed to switch 47 around pin 46 and the sleeve extending down through the opening in bracket 44 is sealed around the opening in elbow 42 by welding or other suitable means. Switch 47 is supported by sleeve 43b and it may be additionally supported by a frame (not shown) from bracket 44.

Fig. 4 shows another embodiment of my invention wherein a plate 51 is shaped to conform to the interior surface of elbow 48 in which the plate is located, and is supported in a hinged fashion inside the elbow by pin 53 which is attached to support 52. Switch 54 is rigidly attached to bracket 50 and is positioned within case 49 which is supported by bracket 50, and bracket 50 is attached by bolts 50a to elbow 48. The operating button of switch 54 is pin 55 and it passes through openings in the elbow and bracket and is closely associated with plate 51. When fluid is flowing in elbow 48 plate 51 is pushed by the flowing fluid against pin 55 to operate the switch.

Fig. 5 shows an embodiment of my invention wherein it is desirable that the fluid within the elbow not be allowed to leak from the elbow and contact the switch. Plate 59 is rigidly positioned on the reduced-diameter threaded portion of pin 60 by nut 60a, and the pin passes up through openings in elbow 56 and bracket 58. Pin 60 also passes through bellows 61 which is sealed to the pin and around the elbow opening. Pin 60 is shown closely associated with lever 62 which is attached in a hinged fashion by pin 63a which is supported by frame 63 which are attached to and supported by bracket 58. Bracket 58 is attached by bolts 58a to elbow 56. The arrangements of the free-end of pin 60 with lever 62 is such that the movement of pin 60 will operate lever 62. Lever 62 is associated with spring lever 64 of switch 66 in such a fashion that lever 62 will operate spring lever 64 which operates button 65 of switch 66. Switch 66 is supported within case 57 and is rigidly attached to a bracket (not shown) which is supported by bracket 58 which also supports case 57.

Fig. 6 shows a number of different designs of plates which are usable in my device. These designs are not intended to limit the design of plates usable in my device but merely to illustrate a number of suitable designs. The first design shown is represented by plate 67 supported by weld 68a on pin 68 which extends through an opening in the center of the plate. Plate 67 is a curved circular plate which is curved to fit the contour of an elbow. The second design is represented by plate 69 attached by welding or other suitable means to pin 70. This plate is a flat plate which may be of any convenient shape, e. g., circular, rectangular, etc. This design is not as desirable as the other designs in that it is believed the turbulence in the elbow caused by this plate will be greater than in the case of the other designs. The third design is represented by plate 71 supported by weld 72a on pin 72, which extends through an opening in the plate. This design is similar to the first design except that the plate is a curved but not a circular plate. The last design is represented by plate 73 supported by weld 74a on pin 74 which extends through an opening in the plate. This plate is a curved rectangular plate.

Although the invention has been described in terms of specific embodiments which are set forth in considerable detail it should be understood that this is by way of illustration only and that the invention is not necessarily limited thereto. Accordingly, modifications are contemplated which may be made without departing from the spirit of the described invention or the scope of the appended claims.

I claim:

1. A flow-responsive device comprising an elbow having a straight inlet portion, a curved middle portion and a straight outlet portion, a movable plate supported in said elbow in the middle portion and adjacent the outer curved wall thereof, said plate being shaped to conform to the outer curve of said elbow and being positioned transverse to the axis of the inlet portion whereby the plate is impinged by fluid from said inlet portion, a pin attached substantially perpendicular to said plate near the center thereof, a lever positioned outside said elbow, said pin passing through an opening in said elbow and being operatively associated with said lever in such a fashion that said pin will operate said lever, means to prevent said pin from dropping completely out of the opening in said elbow and a switch positioned outside said elbow, said switch being associated with and operable by said lever.

2. A gas-flow responsive device comprising an elbow having a straight portion, a curved inlet portion and a straight outlet portion positioned with its inlet portion slanted downward from the horizontal, a circular movable plate supported in said elbow in the middle portion and adjacent the outer curved wall thereof, said plate being curved to conform to the outer curve of said elbow and being positioned transverse to the axis of the inlet portion whereby the plate is impinged by fluid from said inlet portion, a pin attached substantially perpendicularly to said plate near the center thereof, a hinged lever attached to and located outside said elbow, said pin passing through an opening in said elbow and being operatively associated with said lever in such a fashion that said pin will operate said lever, means to prevent said pin from dropping completely out of the opening in said elbow, and a switch attached to and located outside said elbow, said switch being associated with and operable by said lever.

3. The device of claim 1 wherein a bellows is attached to said pin and to the elbow around the opening therein to provide a fluid-tight seal and to prevent fluid from escaping from the elbow and bellows.

4. The device of claim 1 wherein said switch has a spring lever for actuating its operating button and said spring lever is operable by said lever.

5. The device of claim 2 wherein said pin is rigidly attached to said lever, and an adjustable screw is attached to said lever to limit its movement in a downward direction.

6. The device of claim 2 wherein a gas-tight case encloses the switch, lever and opening in the elbow to prevent gas from escaping from the elbow and case.

References Cited in the file of this patent

UNITED STATES PATENTS

| | | |
|---|---|---|
| 1,401,299 | Wohlenberg | Dec. 27, 1921 |
| 1,504,770 | Lieber | Aug. 12, 1924 |
| 1,693,309 | Mettler | Nov. 27, 1928 |
| 1,720,180 | Keiser | July 9, 1929 |
| 2,012,210 | Williams | Aug. 20, 1935 |
| 2,285,749 | Stuart | June 9, 1942 |
| 2,329,292 | Perry | Sept. 14, 1943 |
| 2,405,243 | Speare | Aug. 6, 1946 |
| 2,604,313 | Grantham | July 22, 1952 |
| 2,707,394 | Lewis | May 3, 1955 |